April 9, 1968 J. K. RADCLIFFE 3,377,518

MAGNETOSTRICTIVE DELAY LINE DRIVER

Filed June 1, 1966

INVENTOR
JERRY K. RADCLIFFE

BY John C Black

ATTORNEY 3,377,518

MAGNETOSTRICTIVE DELAY LINE DRIVER

Jerry K. Radcliffe, Cortland, N.Y., assignor to International Business Machines Corporation, Armonk, N.Y., a corporation of New York Filed June 1, 1966, Ser. No. 554,454
6 Claims. (Cl. 317—148.5)

Figure 1:
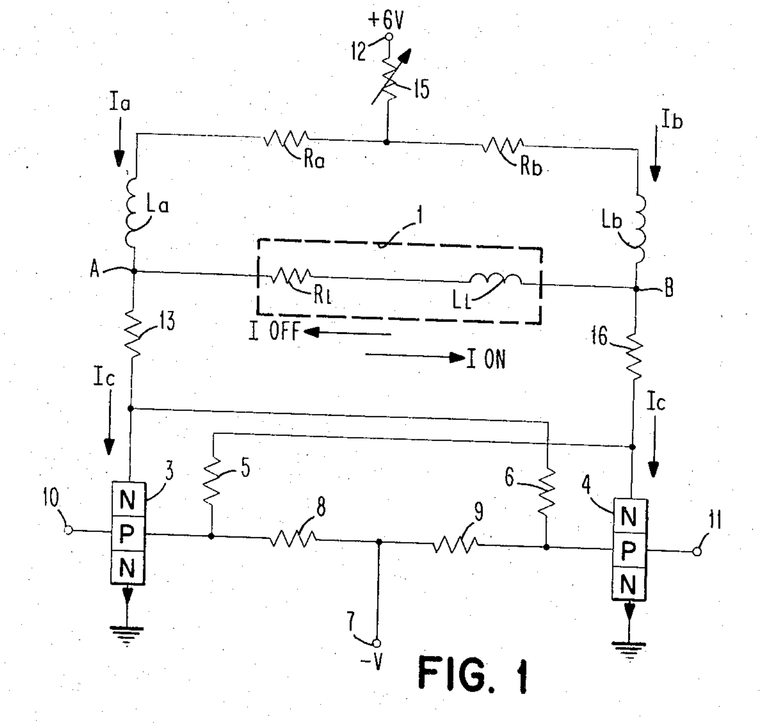

This invention relates to improvements in drive circuits for inductive loads and more particularly for high speed magnetostrictive delay lines.

In data processing apparatus, magnetostrictive delay lines are sometimes used as data storage devices. Since data is stored within the delay line dynamically, much of the data must be regenerated and returned to storage via the drive transducer subsequent to its reaching the pickup transducer at the end of the line.

Timing pulses from a clock and various circuits selectively control the data regeneration. As a result, the pulse width of the data, as well as the timing of the data entry into the delay line, are critical in order to assure the reliable regeneration of the data.

Since the amount of data which can be stored in the delay line is proportional to the data cycle rate, relatively high rates in the order of 1 megacycle or greater are chosen.

Moreover, due to the characteristics of the delay line construction, substantially equal rise and fall times for the drive transducer pulses must be provided in order to assure optimum output signal levels and minimum distortion. For example, in a typical application in which the data cycle rate is in the order of 2 megacycles, the nominal data pulse width will be in the order of 150 nanoseconds; and the rise and fall times of the current pulse into the delay line transducer coil must be maintained to relatively equal, small values in the order of 80 to 150 nanoseconds.

Furthermore, the transducer drive circuit responds to input pulses, and the widths and the rise and fall times of these pulses must be carefully controlled. In addition, there must be a constant amount of delay between the leading edges of the input pulse to the drive circuit and the leading edge of the current pulse to the transducer coil if the data is to be maintained compatible with the clock timing which is common to both the input and output transducers.

It is also required that the amplitude of the coil drive current must be maintained within some small tolerance (equal to or less than ±10%) of the nominal drive current. This tolerance must be at all times, independent of data pulse patterns. Therefore, the drive must not be "pattern sensitive." "Patttern sensitivity" is denoted as changes in coil drive current amplitude as a result of driver response to long series of consecutive data bits (logic "1's") preceded by long series of idle cycle (logic "0's"), or any other pulse program. "Pattern sensitivity" results from the fact that the inductor-current source is not an ideal current source but does exhibit some finite time constant.

In the past, the use of magnetostrictive delay lines has been generally in environments within which it was possible to provide relatively high voltage supplies in the order of 20 volts or more for driving the delay line drive coil.

However, with the advent of the microminiaturization of circuit components, supply voltages have been drastically reduced to values in the order of from 3–6 volts, at least partly due to the need for lower heat producing power consumption. Where separate high voltage power supplies cannot be justified for the delay line drivers, it is necessary to utilize the existing low voltage supplies.

The need arises for a reliable, high speed driver utilizing a low voltage supply.

Magnetostrictive delay lines are typically operated in one of two modes, i.e. the RZ mode (return-to-zero) and the NRZ (non-return-to-zero). In the RZ mode of operation the logical "0" and logical "1" data bits are represented by the absence and presence of a discrete pulse which swings from a first defined voltage reference level to a second level and back to the initial level. The NRZ mode of operation, on the other hand, is characterized by a continuous unchanging value of potential at either of two reference levels for the logical "0" condition and a change from one of said levels to the other in either direction representing a logical "1" condition.

It will be appreciated, therefore, that data bits in the RZ mode of operation can be of uniform width and, therefore, exhibit a predetermined frequency characteristic. On the other hand, in the NRZ mode, the width of a particular pulse as it goes from one level to another and then back to the initial level, varies depending upon the sequence of the logical bits which it represents. Hence it has no fixed frequency characteristic.

In co-pending U.S. application of J. W. Sumilas, Ser. No. 470,792, filed July 9, 1965, entitled "Magnetostrictive Delay Line Driver" and assigned to the assignee of the present invention, a driver is shown which operates at high frequencies and with low voltage supply levels. However, the embodiment of FIG. 1 of the co-pending application can be operated satisfactorily at only one selected frequency; hence it can be used only in the RZ mode. The other embodiment of the co-pending application permits operation at different frequencies and therefore can be utilized in the NRZ mode.

It is the primary object of the present invention to provide RZ and NRZ drivers for magnetostrictive delay lines, which drivers exhibit significantly improved operating characteristics at high frequencies and low voltage supply levels.

It is a broader object of the present invention to provide improved drive circuits for large inductive loads at high frequency rates with low voltage supply levels.

These objects are achieved in a preferred embodiment of the present invention by providing a drive circuit for the magnetostrictive delay line transducer which includes a resistor and an inductor, the values of which bear a predetermined relationship with the values of the resistance and inductance in the transducer. So long as this relationship is provided, the rise time of the current pulse which drives the transducer can be effectively maintained constant irrespective of the pattern of the data bits. As a result, a very high degree of pattern insensitivity is achieved. This relationship will be discussed in detail below with respect to FIGS. 1 and 2.

In addition, the preferred embodiment for NRZ mode of operation provides a bistable device with symmetrical impedance legs. The transducer is connected between intermediate points in said legs. The bistable device includes two inputs so that a pulse applied to either input causes essentially the same change in circuit conditions except with respect to the direction of the change in current within the transducer, whereby equal rise and fall times can be more closely approached than in known existing circuits. Consequently, a greater freedom from pattern sensitivity is assured.

Since in RZ mode of operation it is primarily only one of the two transients which is most significant to the reliable detection of output signals, a bistable drive can be used but is not a necessary requirement. The leading edge of a logical "1" pulse is of primary consequence in the RZ mode; and, therefore, the drive circuit may be of the single-ended input type with the improved drive means responding only to the leading edge of the pulse. Other, simpler means respond to the trailing edge transient of the pulse as will be seen below.

The foregoing and other objects, features and advantages of the invention will be apparent from the following more particular description of preferred embodiments of the invention, as illustrated in the accompanying drawings.

Figure 2:
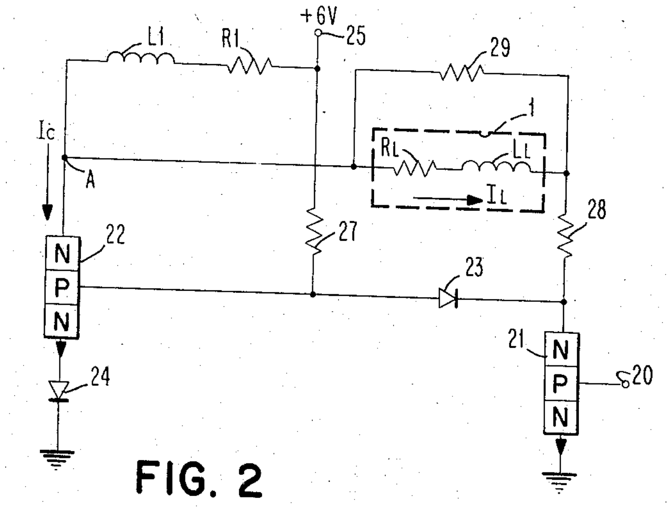

In the drawings:

FIGS. 1 and 2 illustrate schematically two embodiments of magnetostrictive delay line drivers constructed in accordance with the teachings of the present invention.

The driver of FIG. 1 is adapted to be driven by complemented input signals and positively drives the delay line transducer in both directions. It is particularly well suited to driving the delay line in an environment wherein the NRZ mode of operation is employed. It can also be used in the RZ mode.

The embodiment of FIG. 1 includes a delay line transducer 1 having an inductance $L_L$ and a resistance $R_L$. The circuit includes a bistable device 2 having grounded emitter transistor amplifiers 3 and 4 which are cross coupled by means of current limiting resistors 5 and 6 for bistable operation. The base electrodes of the transistors 3 and 4 are connected to a negative supply terminal 7 by way of resistors 8 and 9, respectively, which resistors assure turn-off of their respective transistors when the opposite transistor is turned on. The base electrodes of the transistors are also connected to input terminals 10 and 11 which receive bivalued input pulses.

The collector electrode of the transistor 3 is connected to a positive supply terminal 12 by way of a resistor 13, an inductor $L_a$, resistor $R_a$ and a variable resistance 15. The collector electrode of the transistor 4 is connected to the positive terminal 12 by way of a resistor 16, an inductor $L_b$, a resistor $R_b$ and the variable resistance 15. In order to provide a symmetrical circuit, the resistors $R_a$ and $R_b$ are selected to be equal as are the inductances $L_a$ and $L_b$ and the resistors 13 and 16. The variable resistance 15 is adjusted for final attainment of the precise transducer drive current levels.

Assume that the transistor 3 is conducting and that the transistor 4 is nonconducting. A first current $I_a$ flows from the terminal 12 to ground potential over the series circuit including the resistance 15, the resistor $R_a$, the inductor $L_a$, the resistor 13 and the transistor 3. A second current $I_{off}$ flows from the terminal 12 to ground potential by way of a path including the resistance 15, resistor $R_b$, the inductor $L_b$, the transducer inductance $L_L$ and resistance $R_L$, the resistor 13 and the transistor 3. During this time the resistor 9 assures that the transistor 4 is completely turned off. Base current for the transistor 3 is supplied by way of the resistor 5, the resistor 16, the inductor $L_b$, the resistor $R_b$ and the resistance 15.

When a negative pulse is applied to the input terminal 10, the transistor 3 is turned off. As the collector current $I_c$ of the transistor 3 begins to decrease, the current $I_a$ tends to decrease at the same time. However, this causes the inductor $L_a$ to produce a positive voltage spike at junction A which causes the transistor 4 to be turned on with a very short time delay and forces the current in the load inductance $L_L$ to reverse rapidly.

With the transistor 3 turned off and the transistor 4 turned on, a current $I_{on}$ flows through the transducer inductance $L_L$; it is summed with a current $I_b$ and flows to ground by way of the resistor 16 and the transistor 4.

The application of a negative pulse to the input terminal 11 will return the circuit to its initial state with the transistor 3 conducting and the transistor 4 nonconducting, the operation being similar to that described above with respect to the negative pulse at the terminal 10.

Optimum operation is achieved if the current in the transducer 1 during a transition period (turnoff of transistor 3) changes rapidly to the desired steady state value, $I_{on}$, thereby rendering the circuit insensitive to the data pulse pattern. Substantial overshoot or undershoot of the initial current transition is followed by a time constant decay or rise toward the desired steady state value. If the current has not stabilized at the steady state value (equilibrium) before the next transition in current, i.e. a negative input pulse applied to the terminal 11, the amplitude of the next transition in current is a function of the pulse width; that is, the time interval between transitions in current. These time constant changes in current toward an equilibrium value occur between transitions of current in both directions. If these changes have not reached the equilibrium values prior to each succeeding transition, the amplitudes of the current transitions will vary in accordance with the amount of time constant change which has taken place with respect to each next preceding transition. The net effect is to make the amplitudes of the transitions sensitive to both the pulse patterns and pulse widths. At very low frequencies, this is no problem; but, as the desired frequency of operation increases, the pattern sensitivity problems become intolerable.

Optimum operation is achieved in a preferred embodiment by providing an alternating current circuit characteristic which is essentially similar to the direct current (steady state) characteristic. During steady state operation, the relative values of the currents are determined essentially by the values of the pertinent resistors; during the transients, current values are determined by both the resistor and inductor values.

The values of $R_L$ and $L_L$ are fixed by reason of the selection of the transducer 1. The value of $R_a$ is selected to provide the desired value of $I_{on}$. The value of $L_a$ is then determined in accordance with the equation $$\frac{L_a}{L_L} \approx \frac{+\Delta I_c \cdot R_a - \Delta V_B}{+\Delta I_c \cdot R_L + \Delta V_B} \quad (1)$$

where:

$R_a$ is assumed to include not only the value of the resistor $R_a$ but also the value of the resistance in the inductor $L_a$;

$+\Delta I_c$ is the decrease in collector current in transistor 3 during turnoff; and $\Delta V_B$ is the positive-going change in the voltage level at junction B during the transition, ($\approx R_L \cdot I_{off}$).

In those instances in which the change in voltage at the junction B can be maintained very small when transistor 3 turns off, the term $\Delta V_B$ may be neglected without sacrifice of the significantly improved operation. The equation for selecting $L_L$ may then be rewritten as follows:

$$\frac{L_a}{L_L} \approx \frac{R_a}{R_L} \quad (2)$$

It will be noted that Equation 1 above is a close approximation. It does not take into account the effect of the relatively small stray capacitance in the transducer and the loading effect of the relatively high impedance transistor cross-coupling circuits. These effects are of a minor nature in the specific embodiment and may be neglected without sacrificing the improved performance.

As a result of the use of Equation 1 or 2 to select the value of $L_L$, a minimum value of $L_L$ may be utilized. This results in a minimum voltage spike being produced at the junction A when the transistor 3 is tuned off, whereby lower breakdown voltage transistors may be used and whereby power dissipation is minimized.

Equal and opposite drive currents $I_{off}$ and $I_{on}$ are desirable and tend to compensate for any transition current errors that might arise. In addition a symmetrical circuit arrangement is desired. Consequently, $R_b$ and $L_b$ are selected in the same manner as $R_a$ and $L_a$ and are chosen to have the same values, i.e. $R_b \approx R_a$ and $L_b \approx L_a$. The absolute values of $I_{on}$ and $I_{off}$ are therefore substantially equal.

The use of a symmetrical bistable device 2 causes an identical sequence of operations during each current transition from $I_{off}$ to $I_{on}$ and vice versa. This results in more nearly equal current rise and fall transients, as well as constant transients as patterns vary.

One specific drive circuit of the type shown in FIG. 1 exhibited improved operating characteristics at a two megacycle data rate, using the following component values; it will be appreciated, however, that these values are given merely by way of example:

| Component: | | Value |
|---|---|---|
| $R_a$ (including resistance in $L_a$) | ohms | 66 |
| $R_b$ (including resistance in $L_b$) | do | 66 |
| **15** | do | 0–62 |
| **13, 16** | do | 27 |
| **5, 6** | do | 300 |
| **8, 9** | do | 1600 |
| $L_L$ | microhenries | ≈20 |
| $L_a$, $L_b$ | do | ≈150 |

The embodiment of FIG. 2 includes only one input terminal 20 which is connected to a source of bivalued control signals (not shown) which cause a first transistor 21 to be turned alternatively to its conducting or non-conducting state. A second transistor 22 has its base electrode coupled to the collector electrode of the transistor 21 by way of a diode 23. The emitter electrode of the transistor 22 is connected to ground potential by way of a diode 24 which assures turnoff of the transistor 22 when the transistor 21 is conducting. The collector electrode of the transistor 22 is connected to a positive supply terminal 25 by way of an inductor $L_1$ and a resistor $R_1$. A resistor 27 couples the positive supply terminal 25 directly to the base of the transistor 22 and to the collector electrode of the transistor 21 by way of the diode 23. The collector electrode of the transistor 21 is also coupled to the collector electrode of the transistor 22 by way of a resistor 28 and the resistance $R_L$ and inductance $L_L$ of the transducer 1. A damping resistor 29 is connected across the transducer 1 to minimize ringing caused by stray capacitance.

When the signal at the input terminal 20 is at its negative value, the transistor 21 is in its non-conducting state, whereby the bias current through the resistor 27 turns on the transistor 22. With the transistor 21 off, no current flows through the transducer 1, the collector current $I_c$ flowing through the resistor $R_1$ and the inductor $L_1$.

If a positive-going potential is now applied to the base electrode of the transistor 21, the latter transistor is driven to saturation. Base current is diverted from the transistor 22 into the collector of the transistor 21 by way of the diode 23 causing the transistor 22 to be turned off. As the collector current $I_c$ decreases, the inductor $L_1$ produces a positive voltage spike at the junction A which forces a current $I_L$ through the transducer resistance $R_L$ and inductance $L_L$ and into the collector of the transistor 21 by way of the resistor 28.

When the input signal at the terminal 20 is returned to its negative level, the transistor 21 is turned off, reducing $I_L$ to zero. The inductive reaction of the inductance $L_L$ produces a positive voltage spike at the collector electrode of the transistor 21; however, no significant current flow occurs since the diode 23 is reverse biased and the transistor 21 is turned off. This allows base current to flow into the transistor 22 to return the circuit to its original state.

This circuit utilizes the improved drive technique only to produce the fast rise time of the current pulse $I_L$ when the transistor 22 is turned off. Rapid fall time in the current is produced by turning off the transistor 21 rapidly and by utilizing the diode 23 to produce an open circuit path for the transducer inductance. Equal rise and fall times cannot be assured; however, this embodiment is intended for use in the RZ mode. In this mode, it is frequently the leading edges of the input data signals which are utilized in the detection circuits coupled to the output of the delay line. Hence, the particular trailing edge characteristics are not as critical, merely a fast fall time being adequate.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An electronic switching circuit for driving a large inductive load at high frequency data pulse rates substantially free of pattern sensitivity, comprising a low voltage source of energy having a pair of terminals, a first conductive path for current including a first resistor, a first inductor and a first transistor switch connected in series between the terminals, a second conductive path for current including a second transistor switch and the inductive load connected in series between one of the terminals and the junction between the inductor and the first transistor switch, and means for turning the first switch from an on to an off state and the second switch from an off to an on state to induce in the inductor a voltage spike which causes a rapid rise in current in the inductive load, the value of the first inductor being selected substantially in accordance with the equation $$\frac{L_a}{L_L} \approx \frac{+\Delta I_c \cdot R_a - \Delta V_B}{+\Delta I_c \cdot R_L - \Delta V_B}$$

where:

$L_a$ is the value of the first inductor, $L_L$ is the value of the inductive load, $R_a$ is the sum of the values of the first resistor and the resistance in the first inductor, $R_L$ is the value of the resistance of the inductive load, $\Delta V_B$ is the positive-going change in voltage at the junction between the inductive load and the second switch, and $\Delta I_c$ is the change in collector current in the first switch when it is turned from its on state to its off state, to cause said rapid rise in current in the inductive load to be to a level substantially equal to a predetermined value of steady state current in the load.

2. The switching circuit set forth in claim 1 together with a second inductor and second resistor connected in series between the second switch and the other terminal and equal in value to the first inductor and first resistor, means connecting the transistor switches in the form of a bistable device, and means for applying input signals to each switch for operating the device sequentially in one state and then the other.

3. The switching circuit set forth in claim 2 together with a third resistor of selected value interposed between the other terminal and the first and second resistors, and additional resistors interposed between the first and second transistor switches and the first and second inductors.

4. An electronic switching circuit for driving a large inductive load at high frequency data pulse rates substantially free of pattern sensitivity, comprising a low voltage source of energy having a pair of terminals, a first conductive path for current including a first resistor, a first inductor and a first transistor switch connected in series between the terminals, a second conductive path for current including a second transistor switch and the inductive load connected in series between one of the terminals and the junction between the inductor and the first transistor switch, and means for turning the first switch from an on to an off state and the second switch from an off to an on state to induce in the inductor a voltage spike which causes a rapid rise in current in the inductive load, the value of the first inductor being selected substantially in accordance with the equation $$\frac{L_a}{L_L} \approx \frac{R_a}{R_L}$$

where:

$L_a$ is the value of the first inductor, $L_L$ is the value of the inductive load, $R_a$ is the sum of the values of the first resistor and the resistance in the first inductor, and $R_L$ is the value of the resistance of the inductive load, to cause said rapid rise in current in the inductive load to be to a level substantially equal to a predetermined value of steady state current in the load.

5. The switching circuit set forth in claim 4 together with a second inductor and second resistor connected in series between the second switch and the other terminal and equal in value to the first inductor and first resistor, means connecting the transistor switches in the form of a bistable device, and means for applying input signals to each switch for operating the device sequentially in one state and then the other.

6. The switching circuit set forth in claim 5 together with a third resistor of selected value interposed between the other terminal and the first and second resistors, and additional resistors interposed between the first and second transistor switches and the first and second inductors.

References Cited

UNITED STATES PATENTS 3,344,321 9/1967 Sumilas ------------ 317—148.5

MILTON O. HIRSHFIELD, *Primary Examiner.*

J. A. SILVERMAN, *Assistant Examiner.*

UNITED STATES PATENT OFFICE

CERTIFICATE OF CORRECTION

Patent No. 3,377,518 April 9, 1968

Jerry K. Radcliffe

It is certified that error appears in the above identified patent and that said Letters Patent are hereby corrected as shown below:

Column 6, lines 33 and 34, the equation should appear as shown below:

$$\frac{L_a}{L_L} \approx \frac{+\Delta I_c \cdot R_a - \Delta V_B}{+\Delta I_c \cdot R_L + \Delta V_B}$$

Signed and sealed this 9th day of September 1969.

(SEAL)

Attest:

Edward M. Fletcher, Jr.

Attesting Officer

WILLIAM E. SCHUYLER, JR.

Commissioner of Patents